No. 777,833. PATENTED DEC. 20, 1904.
C. F. BIRTMAN.
STATIC ELECTRICAL MACHINE.
APPLICATION FILED FEB. 6, 1904.
NO MODEL. 4 SHEETS—SHEET 1.
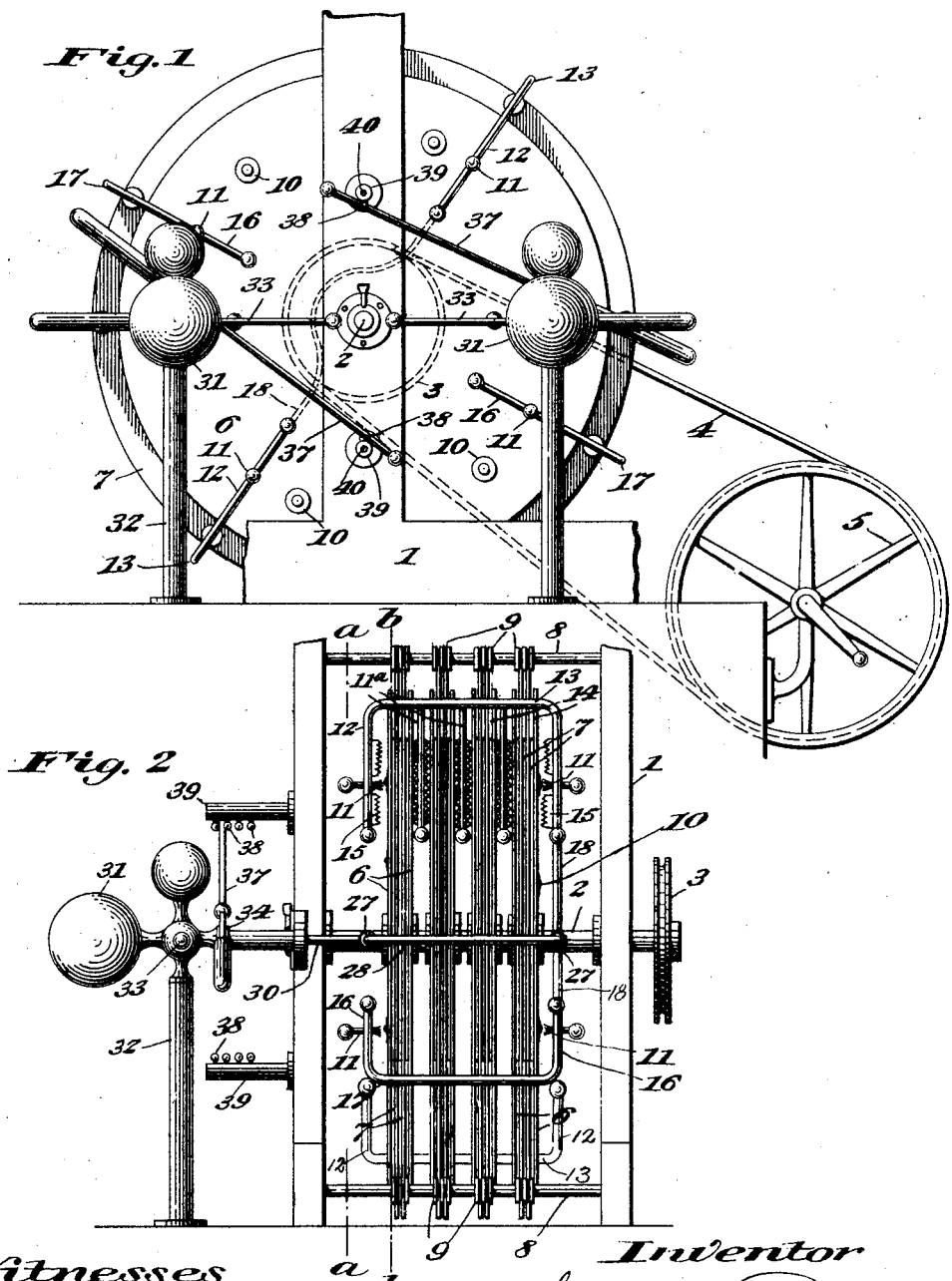

No. 777,833. PATENTED DEC. 20, 1904.
C. F. BIRTMAN.
STATIC ELECTRICAL MACHINE.
APPLICATION FILED FEB. 6, 1904.
NO MODEL. 4 SHEETS—SHEET 2.
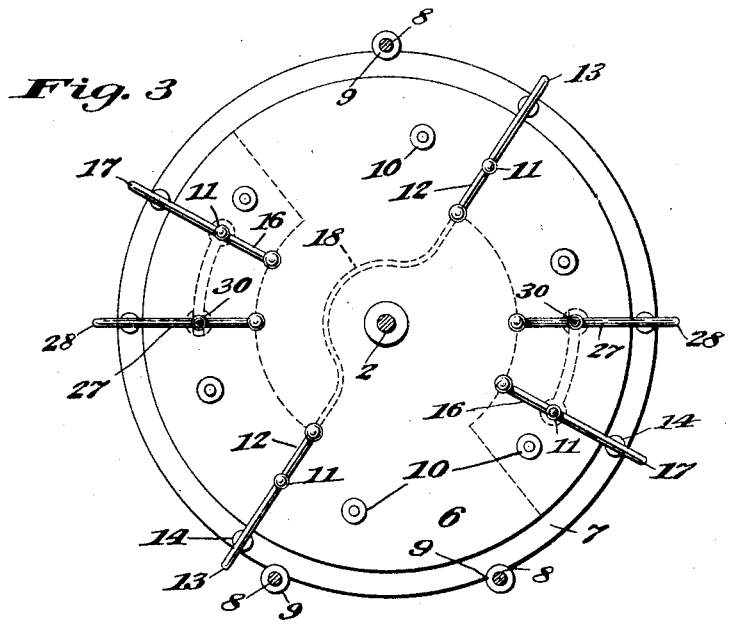
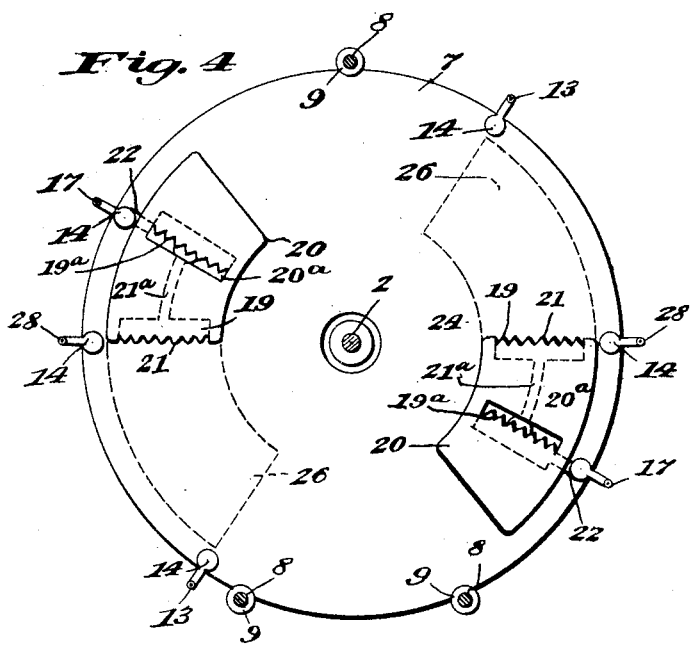
Witnesses
J. D. Gathuiju
A. Gustafson
Inventor
Charles F. Birtman
By Chas. C. Tittman
Attorney No. 777,833. PATENTED DEC. 20, 1904.
C. F. BIRTMAN.
STATIC ELECTRICAL MACHINE.
APPLICATION FILED FEB. 6, 1904.
NO MODEL. 4 SHEETS—SHEET 3.
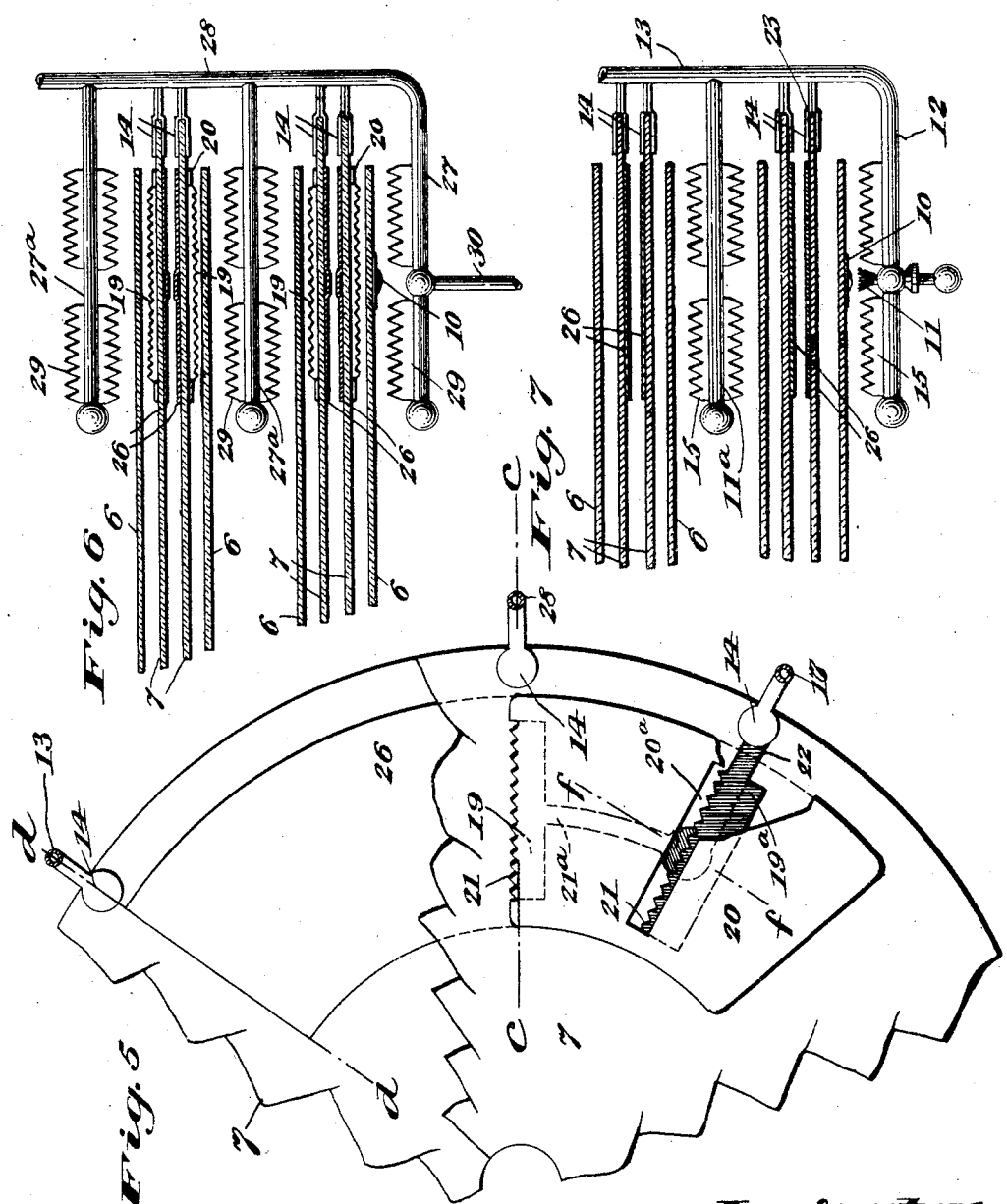

No. 777,833. PATENTED DEC. 20, 1904.
C. F. BIRTMAN.
STATIC ELECTRICAL MACHINE.
APPLICATION FILED FEB. 6, 1904.
NO MODEL. 4 SHEETS—SHEET 4.
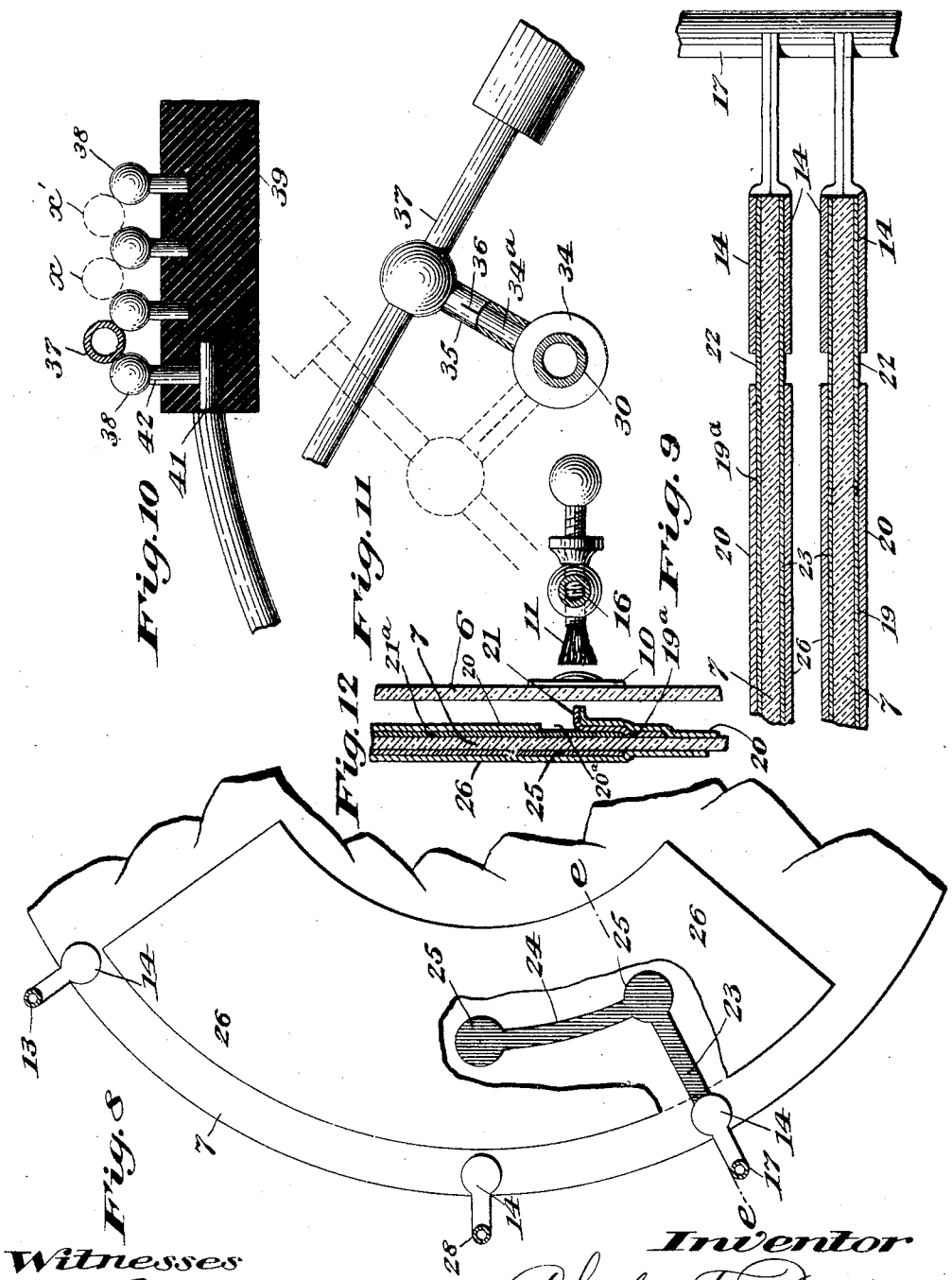

No. 777,833.

Patented December 20, 1904.

UNITED STATES PATENT OFFICE.

CHARLES F. BIRTMAN, OF CHICAGO, ILLINOIS.

STATIC ELECTRICAL MACHINE.

SPECIFICATION forming part of Letters Patent No. 777,833, dated December 20, 1904.

Application filed February 6, 1904. Serial No. 192,272.

*To all whom it may concern:*

Be it known that I, CHARLES F. BIRTMAN, a citizen of the United States of America, and a resident of Chicago, in the county of Cook and State of Illinois, have invented certain new and useful Improvements in Static Electrical Machines, of which the following is a specification.

This invention relates to certain improvements in static electric machines, and has for its object in part to provide for use in connection with such machines generally an improved and simplified pole-changing means capable of use for readily and conveniently changing the polarity of the terminals or electrodes of the machine and in part to provide a machine of this character of a simple and inexpensive nature and of a compact, strong, and improved construction which shall be adapted for self-excitation and which by reason of its improved structure shall afford an increased capacity for the generation of electricity.

The invention consists in certain novel features of the construction, combination, and arrangement of the several parts of the improved static electric machine whereby certain important advantages are attained and the machine is made simpler, cheaper, and of greater capacity and is otherwise better adapted and made more convenient for use, all as will be hereinafter fully set forth.

The novel features of the invention will be carefully defined in the claims.

In the accompanying drawings, which serve to illustrate my invention, Figure 1 is a front elevation showing a static electric machine embodying my improvements, portions of the frame or casing thereof being omitted for lack of space; and Fig. 2 is a side or end elevation of the same. Fig. 3 is a vertical section taken through the machine in the plane indicated by the line $a$ $a$ in Fig. 2 and showing certain details of the structure and arrangement of the moving plates or members thereof, together with the arrangement of the brush, collector, and equalizer arms. Fig. 4 is a sectional view somewhat similar to Fig. 3, but taken in the plane indicated by line $b$ $b$ in Fig. 2 and showing in elevation one of the stationary plates or members of the machine for the illustration of those portions of the armature which are carried on the outer side of said plate or member. Fig. 5 is an enlarged detail view showing fragments of the stationary plates or members of the machine and showing certain details of the construction and arrangement of the armatures thereof, as will be hereinafter explained. Fig. 6 is an enlarged sectional view taken in the plane indicated by the line $c$ $c$ in Fig. 5 through the stationary and moving plates or members at one side or edge thereof for better illustration of the collecting devices. Fig. 7 is a view somewhat similar to Fig. 6, but taken in the plane indicated by line $d$ $d$ in Fig. 5 and showing certain features of the equalizing means to be hereinafter referred to. Fig. 8 is a view somewhat similar to Fig. 5, but showing the portions of the armature upon the inner or reverse sides of the stationary plates or members of the machine. Fig. 9 is an enlarged detail view taken through edge portions of the stationary plates or members of the machine in the plane indicated by line $e$ $e$ in Fig. 8 and showing certain details of the electrical connections between the two sides of the stationary plates or members. Fig. 10 is an enlarged sectional detail view showing means for affording a varying spark-gap for controlling the discharge at the electrodes of the machine. Fig. 11 is an enlarged sectional detail view showing certain features of the adjustable mounting of the pole-changing arms of the device. Fig. 12 is an enlarged sectional detail view taken through one of the brush-arms and the moving and stationary plates or members of the machine in the plane indicated by line $f$ $f$ in Fig. 5 and illustrating certain features of the construction and arrangement of the armature upon the stationary plate or member, as will be hereinafter explained.

As shown in the views, 1 indicates a part of the frame or casing of the machine, and 2 indicates a shaft horizontally extended therein and provided with a pulley 3, adapted to receive an endless belt or band, which is also extended, as shown at 4, around a pulley 5, upon a driving-shaft provided in a well-known way with a crank for manual operation, by which means the shaft 2 may be turned in its bearings.

Upon the shaft 2 are held in any preferred way the moving members of the machine, herein shown as formed of circular glass disks or plates 6 6, and in the structure herein shown these moving members or plates 6 are arranged in pairs upon the shaft. There are four such pairs of the moving members or plates in the construction shown, although it will be evident that the number of pairs employed in a machine is immaterial to my invention, and the plates or members of each pair are spaced apart from each other, so as to receive between them the stationary members or plates 7 of the machine, which are also formed, as herein shown, of circular glass disks having central openings for the passage of shaft 2, the diameters of the plates or members 7 being larger than that of the moving plates or members 6, so that the peripheral edge portions of said stationary plates or members are caused to project beyond the edges of the moving plates in position to be conveniently engaged by devices for the support of said stationary plates.

The supporting devices for the stationary plates or members 7 comprise rods or bars 8 8, extended transversely across the edge portions of said plates or members, above and beneath the same, upon which rods or bars are adjustably held collars 9 9, between which the projecting edge portions of the plates or members 7 are held and whereby said plates or members are firmly supported in alinement with each other and with the moving plates or members. The arrangement of the stationary plates or members 7 7 is also such that their outer surfaces are held out of contact with the inner surfaces of the moving plates or members 6, and the inner adjacent surfaces of the stationary plates or members 7 7 are also spaced apart out of contact with each other.

Upon the moving plates or members 6 6, at front and rear of the machine—that is, on the respective front and rear surfaces of the first and last plates 6 6 on shaft 2—are carried buttons 10, suitably arranged to pass, when the plates or members are turned, beneath brushes 11, of which any preferred number may be employed at the opposite peripheral sides of the plates or members, said brushes 11 being, as shown in Figs. 7 and 12, provided with screw-threaded stems adjustably engaged with enlargements on the central portion of their supporting-arms, so that the brushes may be caused to approach more closely to or be moved farther away from said buttons 10, as will be readily understood. Lock-nuts are also provided on the screw-threaded stems of brushes 11 for holding them in adjusted position. When the brushes are moved toward the buttons, they will act to excite the plates or members 6, so as to give the machine the requisite initial charge; but after the machine has been charged it is evident that said brushes may be withdrawn from proximity to said buttons by merely turning their screw-threaded stems. One set of the brushes 11 at opposite peripheral sides of the members or plates of the machine are supported upon equalizing-arms 12 12, extended in alinement along the outer surfaces of the outer moving plates or members 6 6 on shaft 2, such arms or supports 12 12 at opposite sides of the machine being connected by portions 13, extended transversely across the peripheries of the series of plates or members and supported, as herein shown, by means of clips or projections 14 14, arranged in pairs and adapted to be passed upon opposite sides of the projecting peripheral portion of each stationary plate or member 7, the extremities of said clips or projections 14 being made rounded or circular and being cemented or otherwise securely held to said plates or members 7, so as to afford a firm and secure mounting for the equalizer-arms without requiring the employment of another form of insulated support. The equalizer-arms 12 12 at the back of the machine are also provided with an electrical connection 18, extended between them from the positive to the negative side of the machine, the central portion of said connection being bent or otherwise formed so as not to contact with the shaft 2 or other part of the machine and being properly insulated. At diametrically opposite sides of the machine are also arranged other brushes 11 11 at front and rear of the first and last plates or members 6 6, as seen in Figs. 2 and 12, and these brushes 11 are carried adjustably upon brush-arms 16 16, each extended inwardly from the periphery of the corresponding adjacent plate or member 6 to a suitable distance, the arms at front and rear of each side of the machine being alined and connected by portions 17, similar to the portions 13 of arms 12, and extended across the peripheries of the plates from front to rear of the machine and supported upon the peripheral portions of members or plates 7 7 by clips or projections 14, embracing and cemented or otherwise held to said projecting portions of the stationary plates or members to form a simple insulated support for the brush-arms.

Upon the portions 13 13 of the equalizer bars or arms 12 12 are carried auxiliary arms or bars 11ª 11ª, which are extended in alinement with the outer bars or arms 12 12 between each two adjacent series of plates or members included in the machine, there being, as seen in Fig. 2, three such arms or bars 11ª provided, and upon these auxiliary arms or bars 11ª and also upon the outer arms or bars 12 are provided combs 15 15, directed toward and in proximity to the adjacent surfaces of the corresponding movable plates or members 6 of the machine. Since the auxiliary arms or bars 11$^a$ are located between two plates or members 6 6, it will be evident that each of said auxiliary bars or arms will be provided with a double comb, as clearly shown in Figs. 2 and 7. The equalizing devices above described form a connection between the two series of devices at opposite sides of the machine. At opposite sides of the machine there are also provided alined series of collecting devices (shown in detail in Fig. 6) and arranged between the brush-arms 16 and equalizer-arms 12, and these collecting devices comprise arms 27, extended radially from the peripheries of the plates for suitable distances inward therefrom and connected by supports 28, extended across the edges of the plates or members and supported therefrom by means of clips 14, engaged with the projecting peripheral portions of members, as above described. The arms 27 carry combs 29, directed toward the surfaces of the adjacent plates or members 6 and are located upon the front and rear sides of the machine, and between the plates or members of each series included in the machine there are arranged other similar collecting-arms 27$^a$, also provided with double combs 29, directed toward the corresponding members or plates 6 and connected electrically with the supports 28 in alinement with the outer arms 27.

At the front side of the machine each arm 27 has central connection with a conductor 30, which is extended forward and communicates with a receiver 31, supported on an insulated base 32 in a well-known way, and the receivers 31 31 at opposite sides of the machine are similarly formed and oppositely arranged and are provided with adjustably-mounted discharge-rods 33 33 of well-known form, adapted to be more or less closely approached one to the other for an entire or partial discharge of electricity between the receivers.

The armatures of the stationary plates or members 7 7 comprise segmental sheets or pieces 20 of paper or other suitable material, which are cemented or otherwise held upon the outer sides of the respective members or plates 7 of each pair, and each of the parts or pieces 20 has along one edge and alined with the corresponding collector-arms 27 27$^a$ at that side of the machine a strip or piece 19 of positive conducting material, as metallic foil, held beneath said paper sheet or part 20, with a projecting serrated edge portion 21, free from plate 7 and adapted to extend toward the surface of the adjacent movable member or plate 6 to receive the discharge therefrom, as indicated in Figs. 4, 5, and 12 of the drawings. Each strip 19 has a curved portion directed centrally from it, which portion, as seen at 21$^a$, is held to the surface of the plate 7 beneath the paper strip or piece 20 and is extended around said plate to a point opposite to the brush-arm 16 at that side of the machine, at which point the said strip 21$^a$ terminates in a circular enlargement alined with the brush 11 on said arm.

Opposite the brush-arm 16 the paper sheet or piece 20 is transversely slitted, as seen at 20$^a$ in Figs. 4 and 12, and at said slitted part of the sheet or strip 20 and in alinement with the brush-arm is arranged beneath the said paper sheet or strip another piece or strip, 19$^a$, of metallic foil similar to the piece or strip 19, with a serrated edge portion 21 free from the plate and directed toward the adjacent movable member or plate 6 and with its central part in electrical communication with the circular enlargement at the end of strip 21$^a$ which extends between and forms an electrical connection between the two strips or parts 19 and 19$^a$.

Each strip or piece 19$^a$ has an outwardly-directed portion 22 extended across the peripheral projecting portion of the member 7 for electrical communication with the adjacent clip 14 and through said clip with the transversely-extended connection 17 between arms 16 16, and upon the inner surface of each stationary plate or member 7 there is extended from the clip 14 of part 17 of the brush-arms, as seen in Figs. 8 and 9, a similar conducting piece or strip 23 of metal foil, which is directed inward across that surface of the member 7 and has connection with one end of a curved strip or piece 24 of metal foil, which is held on the inner surface of member 7 in alinement with the paths of buttons 10 on plates 6 and is provided at its ends with circular enlargements 25, one of which corresponds in arrangement with the circular enlargement at the end of strip 21$^a$ on the outer side of the plate 7 and the other of which is arranged in alinement with the strip 19 on the outer side of said plate or member 7 and also with the collecting-arms 27 at that side of the machine.

Over the metal foil 23 upon the inner surface of each plate or member 7 is cemented or otherwise held to said plate a segmental sheet or piece 26 of paper or similar negative material extended in alinement with the strip or piece 20 on the outer surface of the plate, but having an end portion extended beyond the termination of piece 20 at the collecting-arms 27 around the plate or member 7, with its extremity in alinement with the equalizer-arms 12 12.

By this arrangement it will be seen that portions of the armature are carried upon each side or surface of each stationary member or plate, an electrical connection being established across the edge of the plate between said two sides, so as to greatly increase the capacity of the machine for the generation of electricity. The connection between the portions of the armature upon opposite surfaces of each plate or member 7 is also such as to connect each side of each plate or member 7 of the respective pairs with the corresponding brush-support 17, so that the said supports 17 form electrical connections between the several plates or members 7 7 comprised in the machine. The arrangement of the armature parts upon the plates or members 7 7 is also such as to entirely prevent the liability of sparking across from the electropositive armature parts to the shaft 2 of the machine or to the equalizer-arms 12 12, so that the loss occasioned by such sparking, which would greatly lessen the capacity of the machine for electrical generation and would also result in quick deterioration, is altogether prevented.

The improved machine constructed as above described is adapted for self-excitation, the arrangement and structure of the several parts permitting the brushes 11 to be withdrawn from proximity to the buttons 10 without lessening the efficiency of the machine after it has been initially charged, and in connection with the machine thus constructed I have shown my improved pole-changing means, which comprises collars 34, held to turn on conductors 30 and having pins or studs 34$^a$, on which are engageable tubular nipples 35 on arms or rods 37, which have insulated handles and are capable of adjustment for effecting a change of polarity in certain terminals or electrodes of the machine. The nipples 35 are provided with slits 36 in their sides, so as to permit them to be readily engaged on the pins or studs 34$^a$, on which the arms or rods 37 are thus adapted for a certain degree of pivotal movement around the axes of the pins or studs, and since the collars 34 turn on conductors 30 it will also be seen that the arms or rods 37 of the pole-changing means may be swung pivotally upon said conductors 30—as, for example, from the position seen in full lines in Fig. 11 to that seen in dotted lines therein.

In connection with the arms or rods 37 37 at opposite sides of the machine and connected with the terminal conductors 30 30 thereof the pole-changing means comprises a series of contacts 38, corresponding with each arm or bar 37, each series of contacts 38 being supported upon a bar or piece 39 of insulating material held on the frame, the arrangement herein shown being such that one of the insulating-supports 39 is above and the other below the plane of the shaft 2 of the machine. The contacts 38 of each series are spaced apart at suitable intervals along the length of the support 39 at distances which may be regulated, as desired, but which is adapted to be bridged by the arc produced by the machine, and each arm or bar 37 is adapted for contact when in one position—as, for example, that seen in full lines in Fig. 11— with one series of contacts 38 and when in its other position, as seen in dotted lines in said figure, is adapted for engagement with the contacts of the other series. By pivotal movement of each arm or rod 37 upon the stud or pin 34$^a$ as a center it will also be evident that said arm or bar may be adjusted along the length of the support 39 to engage either one of the series of contacts 38 thereon. Each insulated support 39 is also provided at its end with a socket adapted to receive the end of a conductor, which may be extended therefrom for use in connection with a vacuum-tube or otherwise, and one of the contacts 38 on each support has a stem 42 extended into said socket in position for engagement with such terminal when the same is inserted in the socket, as indicated at 41 in Fig. 10, so that when the arms or bars 37 are engaged with said contact 38, as indicated in full lines in Fig. 10, the charge will be transmitted from conductor 30 through arm or rod 37 to contact 38 and thence to the conductor 41. In a like manner it will be seen that when the arms or rods are adjusted along the supports 39 into engagement with successive contacts 38 thereon, as indicated in dotted lines at $x$ and $x'$ in said figure, a gap or gaps will be produced in the path of the discharge, which will be bridged by arcs in such a way as to lessen or increase the intensity of the discharge through the conductors 41. In Fig. 1 I have shown one of the arms or rods 37 raised and engaged with a contact 38 of the upper series and the other arm or rod lowered and engaged with a contact of the lower series, and in this way a certain polarity will be afforded at each of the contacts 38, which may be changed at will by reversing the arrangement of the arms or rods 37 37. By this construction it will be seen that the polarity of the upper and lower contacts 38 may be changed at will, so that it is not required to determine the polarity of the contacts by other testing appliances, as is commonly done prior to connecting up the machine for use. By engaging the arms or bars 37 with each other it will also be seen that the machine may be completely discharged, and it will also be seen that by engaging said arms or bars 37 37 with different contacts 38 in the same series a partial discharge of the machine may be had independent of the employment of the discharge-rods 33 33.

The improved machine constructed as above described is of an extremely simple and inexpensive nature and is especially well adapted for use owing to the increased capacity afforded by the utilization of the two side surfaces of each plate or member 7 for the generation of electricity. The construction is also extremely advantageous, for the reason that the peculiar means employed for supporting the brushes and collecting-arms upon the stationary members permits of altogether dispensing with additional insulated supports therefrom, whereby the machine is greatly simplified and cheapened.

The construction of the improved machine with the peculiar formation and arrangement of the armatures also renders the device self-exciting after the initial charge, so that after the machine has been charged the brushes may be thrown out of operation without affecting the operation of the machine in generating electricity. It will also be obvious from the above description that the improved machine is capable of considerable modification without material departure from the principles and spirit of the invention, and for this reason I do not wish to be understood as limiting myself to the precise form and arrangement of the several parts of the device herein set forth in carrying out my invention in practice.

Having thus described my invention, what I claim, and desire to secure by Letters Patent, is—

1. A static electrical machine comprising two disk-like members mounted for relative movement and having parallel surfaces provided at opposite peripheral sides with devices adapted for reciprocal operation for the generation and collection of electricity and equalizing means comprising parts supported upon opposite peripheral sides of one member and having a connection extended between its points of support.

2. A static electrical machine comprising two series of members, those of one series being movable relative to those of the other and the members of one series each having an armature part on each surface, the armature parts on the respective opposite surfaces each comprising an electropositive part and the said electropositive parts on opposite sides of each member being in electrical communication.

3. A static electrical machine comprising two series of members movable relatively one to the other, the members of one series being arranged in pairs between those of the other and each having upon opposite surfaces armature parts which are in electrical communication.

4. A static electrical machine comprising two series of members movable relatively one to the other, armature parts on opposite surfaces of each member of one series and an electrical connection between the armature parts on opposite surfaces of the members of said series and extended across the edge portions of the respective members of that series.

5. A static electrical machine comprising two series of members movable relatively one to the other, the members of one series being arranged in pairs between those of the other series and each having upon opposite surfaces armature parts, electrical connections extended across the edges of the members of said series between the armature parts on opposite surfaces thereof, a bar extended across the edges of the members with parts in electrical communication with said connections and brushes on said bar in proximity to the surfaces of the members of the other series.

6. A static electrical machine comprising a member having on opposite surfaces armature parts each comprising an electropositive part and an electronegative part extended over said electropositive part, the electropositive parts having connection across the edge of said member.

7. In a static electrical machine the combination of two plates one of which is provided with electrically-connected armature parts on opposite surfaces, the armature part on one surface of said plate comprising an electropositive part held on said plate with a portion extended away from the surface of such plate and in proximity to the adjacent surface of the other plate.

8. In a static electrical machine, the combination of two plates one of which is provided with an armature part comprising an electropositive part on one surface of said plate with a portion extended away from the surface of such plate and in proximity to the other plate.

9. In a static electrical machine, the combination of two plates one of which has an armature part comprising an electropositive part on one surface of said plate with a serrated portion extended in proximity to the other plate.

10. In a static electrical machine, the combination of two plates one of which is provided with an armature comprising an electropositive part on one surface of said plate and extended away from the surface of such plate and in proximity to the adjacent surface of the other plate, a brush on the opposite surface of the last-named plate and having electrical connection with said electropositive armature part and a device on said last-named plate for coaction with the brush for initially charging the machine.

11. A pole-changing means for static electrical machines comprising adjustable parts electrically connected with conductors of a static electrical machine and contacts adapted to form terminals of such machine and with which each of said adjustable parts is adapted for electrical communication.

12. A pole-changing means for static electrical machines comprising adjustable parts electrically connected with conductors of a static electrical machine and two series of spaced contacts, one contact of each series being adapted to form a terminal of such machine and the said adjustable parts being each adapted for electrical communication with each contact of each series.

13. A pole-changing means for static electrical machines comprising conductors connected with generating means, parts each supported on and electrically connected with one of said conductors for pivotal movement in two directions at angles to each other and two series of spaced contacts each of which comprises a contact adapted to form a terminal of such machine, each of the pivotal parts being adapted, when swung in one direction, to be approached to one or the other of the respective series of contacts and when swung in another direction to be successively approached to the several contacts in one or the other of said series.

14. In a static electrical machine, the combination of generating devices, terminal conductors, one of which is adapted for electrical communication with the generating devices, a series of spaced contacts adjacent to the other terminal conductor and an electrical connection extended from the generating devices and comprising a part adjustable for electrical communication with one or another contact in said series.

15. In a static electrical machine, the combination of generating devices, an insulated support having a socket, terminal conductors, one of which is electrically connected to the generating devices and the other of which is carried on said support and has a part extended in said socket for electrical communication with a conductor inserted therein, a series of spaced contacts on the insulated support for electrical communication with the terminal conductor thereon and an electrical connection extended from the generating devices and comprising a part adjustable for electrical communication with one or another contact in said series.

16. In a static electrical machine, the combination of two plates one of which has an armature comprising a plurality of parts held on one surface of the plate and each provided with a portion extended away from the surface of such plate and in proximity to the other plate and an electrical connection extended from one part to the other across the surface of the plate to which said parts are secured.

17. A static electrical machine comprising two relatively movable members one of which has at opposite peripheral sides armature parts on opposite surfaces, the armature parts on one surface of said member having extended portions which are out of alinement with the armature parts on the opposite surface of said member, exciting and collecting devices alined with the armature parts on one surface of said member and equalizing means comprising connected parts arranged at opposite peripheral sides of the member and alined with the extended portions of the armature part on the opposite surface of said member.

Signed at Chicago, Illinois, this 28th day of January, 1904.

CHARLES F. BIRTMAN.

Witnesses:
   CHAS. C. TILLMAN,
   A. GUSTAFSON.